United States Patent
Holmberg

(10) Patent No.: US 8,052,846 B2
(45) Date of Patent: Nov. 8, 2011

(54) LIQUID CLEANING DEVICE

(75) Inventor: Peter Holmberg, Ösmo (SE)

(73) Assignee: Purity AB, Stockholm (SE)

( * ) Notice: Subject to any disclaimer, the term of this patent is extended or adjusted under 35 U.S.C. 154(b) by 967 days.

(21) Appl. No.: 11/631,187

(22) PCT Filed: Jun. 27, 2005

(86) PCT No.: PCT/SE2005/001011
§ 371 (c)(1),
(2), (4) Date: Oct. 22, 2007

(87) PCT Pub. No.: WO2006/004502
PCT Pub. Date: Jan. 12, 2006

(65) Prior Publication Data
US 2008/0169181 A1 Jul. 17, 2008

(30) Foreign Application Priority Data

Jul. 2, 2004 (SE) .................................. 0401750

(51) Int. Cl.
*B01D 1/00* (2006.01)
*B01D 3/42* (2006.01)
*B01B 1/06* (2006.01)
*C02F 1/18* (2006.01)
(52) U.S. Cl. ......... 202/206; 159/43.1; 159/44; 202/83; 202/262; 219/492; 392/386; 203/1; 203/10
(58) Field of Classification Search .......... 159/43.1, 159/44; 202/83, 206, 262; 219/492, 552; 392/324, 386, 441, 500; 122/4 A; 203/1, 203/10
See application file for complete search history.

(56) References Cited

U.S. PATENT DOCUMENTS

| 5,110,418 | A | * | 5/1992 | Garrison et al. | ............... 202/181 |
| 5,266,170 | A | * | 11/1993 | Weber et al. | ............... 202/185.3 |
| 5,304,286 | A | * | 4/1994 | Palmer | ............... 202/167 |
| 5,349,167 | A | * | 9/1994 | Simcock | ............... 219/662 |
| 5,492,602 | A | * | 2/1996 | Vogelman et al. | ............... 202/181 |

FOREIGN PATENT DOCUMENTS

| SE | 510 287 | 5/1999 |
| WO | WO 01/89999 | 11/2001 |

* cited by examiner

*Primary Examiner* — Virginia Manoharan
(74) *Attorney, Agent, or Firm* — Drinker Biddle & Reath LLP

(57) ABSTRACT

The invention relates to a liquid cleaning device that is intended for purifying liquid from pollutants, which liquid cleaning device includes a vessel, having a lower chamber and an upper chamber, which lower chamber is connected to a heating member arranged to heat the liquid in said lower chamber, as well as further including a riser and liquid-distributor member, which riser is arranged to transport heated liquid from said lower chamber up to the upper part of said upper chamber, where the liquid-distributor member is arranged to impart the heated liquid an increased area of exposure to surrounding air, the liquid then, by means of the gravity, running back downward outside the riser and being collected in the lower part of the upper chamber of the vessel, said upper chamber and lower chamber being in at least conditioned communication with each other in order to allow transfer of the liquid from the upper chamber to the lower chamber. According to the invention, the heating member is arranged to be capable of assuming at least two power levels and that a change-over member is arranged to automatically reduce the power level of the heating member.

7 Claims, 2 Drawing Sheets

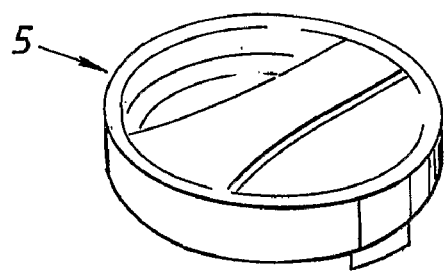
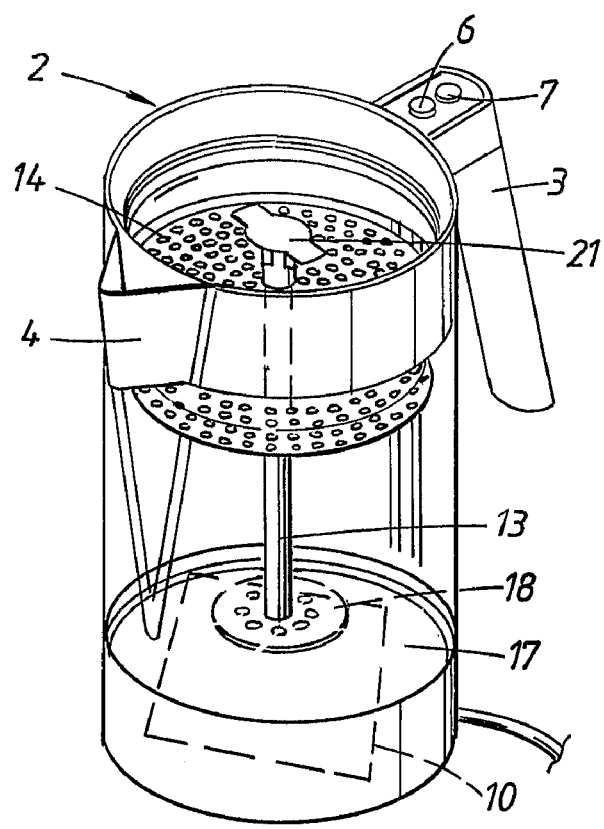
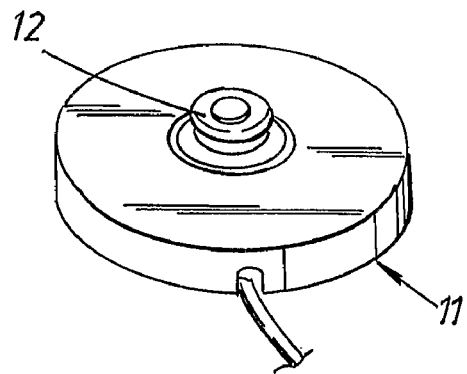

LIQUID CLEANING DEVICE

CROSS REFERENCE TO RELATED APPLICATIONS

This application is a National Stage of International Application No. PCT/SE2005/001011 filed Jun. 27, 2005, and which claims benefit of Swedish Patent Application No. 0401750-5 filed Jul. 2, 2004, which is incorporated by reference herein in its entirety.

TECHNICAL FIELD OF THE INVENTION

The present invention relates to a liquid cleaning device intended for purifying liquid from pollutants, which liquid cleaning device comprises a vessel, having a lower chamber and an upper chamber, which lower chamber is connected to a heating member arranged to heat the liquid in said lower chamber, as well as further comprising a riser and liquid-distributor member, which riser is arranged to transport heated liquid from said lower chamber up to the upper part of said upper chamber, where the liquid-distributor member is arranged to impart the heated liquid an increased area of exposure to surrounding air, the liquid then, by means of the gravity, running back downward outside the riser and being collected in the lower part of the upper chamber of the vessel, said upper chamber and lower chamber being in at least conditioned communication with each other in order to allow transfer of the liquid from the upper chamber to the lower chamber.

BACKGROUND OF THE INVENTION

A problem that the present invention is related to is the following. In most larger cities, tap water is produced in big plants and is transported in piping systems to the consumers. In order to protect the water against risks of infection during the transportation, a certain quantity of chlorine is usually added before the clean water leaves the plant.

A certain quantity of this chlorine is consumed during the way and a certain quantity of is left in the water when it reaches the consumers. The intention of the addition of chlorine is that the chlorine should decompose potentially dangerous organisms and organic impurities in the pipes. When this takes place, chlorinated hydrocarbons of the type chloroform and bromoform are formed. Hence, also these substances are present in a certain quantity in the water that reaches the consumers.

Even if the amount of chlorine and chlorinated hydrocarbons is low in the water, it is known that the two types of impurities are mutagenic also in small doses, and it is therefore an advantage if it is possible to avoid them to as great an extent as possible.

Since long there are different types of filters on the market, by means of which it is possible to clean water from municipal piping or an own well. However, traditional filters that are in the form of fine-meshed nets do not stop volatile substances such as chlorine and chlorinated hydrocarbons. Neither filters that contain ion exchange mass (for instance softeners) manage this.

For this reason, in many places filters containing activated carbon are now used. The disadvantage of activated carbon is that it is difficult to know when the filter is full, and in many examinations it has been found that the activated carbon quickly may lose effect upon an unexpected load increase and in that connection further turn into a refuge, nutrition place and breeding ground for bacteria and pyrogenes.

For this reason, the carbon filter is frequently combined with other methods to a more complicated apparatus where accordingly also pre-filters to stop coarser particles and organic material, ultraviolet-light lamps to kill bacteria, and ion exchangers for picking up ions are included. Such an equipment becomes relatively expensive and works satisfactory only if the exchange of roughing filter, ultraviolet lamps, ion exchange mass and activated carbon is handled accurately. As an alternative to these multi-stage filters, equipment has also been developed based on distillation and the reversed osmosis. None of these methods, advanced per se, is however entirely efficient in removing chlorine and chlorinated hydrocarbons but have to be supplemented with an activated-carbon final filter. Even if the load on this final filter is much smaller than on carbon filters in the previously mentioned multi-stage filters, also these have to be exchanged at regular intervals, and the problem with overload remains.

A simpler way to kill bacteria as well as remove chlorine and chlorinated hydrocarbons and also other volatile substances from water is to boil water in a boiler or open vessel. The disadvantages of this simple method in comparison with what has been mentioned previously are foremost three. A large quantity of water has to be boiled away in order to be sure of getting rid of the volatile impurities, which in the first place entails that water is wasted and in the second place that the possible non-volatile impurities that are present in water are concentrated. The third disadvantage is that the user does not know when a satisfactory result has been attained.

Within the industry, many methods are developed for the separation of liquid from gas, gas from liquid and gas from another gas. The most common principle is the cyclone principle, which is based on a steam/gas/water mixture being centrifuged and the liquid thereby being pressed out of the mixture. A rather similar principle is that the mixture is led through a conduit having many bends, the liquid being stopped by devices of different forms in the bends.

Furthermore, area-enlarging devices are used in such a way that water/gas/steam mixture is sprayed or sprinkled on large plates or is left to run down large sheets or another type of device having a large area, for instance steel wool or plastic balls.

It is also possible to force a gas, for instance air or nitrogen, through the mixture. This gas then drives off or drags along other gases in the mixture. Frequently, a combination of these techniques is used.

A previously known liquid cleaning device of the relevant type is seen in the Swedish patent 518 388, according to which liquid is heated in a vessel having a lower part, provided with heating members, and an upper part intended for the liquid, as well as an inner central tubular riser member for heated liquid rising upward through the riser member, the heated liquid from the upper open end of the riser member by the gravity running back downward through the upper part outside the riser member for renewed heating and vaporization at constant power and time.

Per se, this liquid cleaning device works well. A disadvantage of the liquid cleaning device in the Swedish patent 518 388 is that when the volume of liquid in the product reaches the boiling temperature, the liquid begins to flash at unchanged supply of energy to the cleaning process. This in turn means that the desirable transport of liquid decreases and that a final product that has not been fully cleaned is obtained.

OBJECT OF THE INVENTION

The object of the present invention is to provide a liquid cleaning device that should heat and transport heated liquid until the boiling point of the liquid is reached, the transport of liquid continuing at controlled power, during a fixed time, in order to obtain a final product that contains as little volatile substances as possible, and thereby obviate above-mentioned problems.

SUMMARY OF THE INVENTION

The above object is attained by the present invention in which a liquid cleaning device, intended for purifying liquid from pollutants, has, among other things, a heating member arranged to be capable of assuming at least two power levels and that a change-over member is arranged to automatically reduce the power level of the heating member. Suitable embodiments of the invention are further disclosed herein Thus, according to the present invention, a liquid cleaning device intended for purifying liquid from pollutants is defined, which liquid cleaning device comprises a vessel, having a lower chamber and an upper chamber, which lower chamber is connected to a heating member arranged to heat the liquid in said lower chamber, as well as further comprising a riser and liquid-distributor member, which riser is arranged to transport heated liquid from said lower chamber up to the upper part of said upper chamber, where the liquid-distributor member is arranged to impart the heated liquid an increased area of exposure to surrounding air, the liquid then, by means of the gravity, running back downward outside the riser and being collected in the lower part of the upper chamber of the vessel, said upper chamber and lower chamber being in at least conditioned communication with each other in order to allow transfer of the liquid from the upper chamber to the lower chamber, characterized in that the heating member is arranged to be capable of assuming at least two power levels and that a change-over member is arranged to automatically reduce the power level of the heating member.

In accordance with the invention, the advantage is obtained that the liquid cleaning device, after the boiling point of the liquid having been reached, can proceed to transport liquid at controlled power, during fixed time, which gives a final product that contains very small amounts of volatile substances. By the automatic reduction of the power level of the heating member, the advantage is further obtained that a user does not need to look after the cleaning process in order to know when the power should be reduced, as well as the advantage that the user knows when a satisfactory cleaning result has been attained.

According to an advantageous embodiment of the invention, the change-over member is formed so that the automatic reduction of the power level of the heating member is triggered by the boiling of the liquid. In this way, the transport of liquid continues directly at the reduced power after the boiling point of the liquid having been reached, which entails a quick cleaning process and thereby also a smaller energy consumption for the proper cleaning process, which in turn is positive from an economic aspect. Furthermore, the advantage is obtained that a smaller quantity of liquid is lost than in long and uncontrolled boiling processes. According to an alternative embodiment, the automatic reduction of the power level of the heating member may of course also be triggered by a timer. This preferably takes place so that the timer is set so that the power level is reduced after a certain time counted from when the liquid cleaning device is started. The setting of the timer may advantageously be adjustable by means of, for instance, a knob.

According to an additional advantageous embodiment, the liquid cleaning device may comprise a timer that is formed so that it adjusts the length of the processing time after the boiling of the liquid has started. The setting of the timer may, for instance, be carried out by means of a knob arranged on the timer, which enables a quick and simple setting of the length of the processing time. This entails that it is possible to decide in a simple way in advance and directly upon the beginning of the boiling for how long the cleaning process is wanted to run. Thereby, the cleaning process requires no supervision and a user may spend his/her time with other things while waiting for the cleaning process becoming ready.

According to another advantageous embodiment, the change-over member may comprise a bimetal that reduces the power level of the heating member. In this way, the process can be controlled and optimized so that the transport of liquid is as good as possible without flashing arising. The bimetal may of course be set to react at different desirable temperatures.

Additional features and advantages are seen in the remaining claims.

BRIEF DESCRIPTION OF THE DRAWINGS

The invention will now be described closer by means of non-limiting embodiment examples and reference being made to the accompanying schematic drawings, where FIG. 1 shows a perspective view of an embodiment of the vessel of the liquid cleaning device according to the present invention, FIG. 2 shows a perspective view of a lid of the liquid cleaning device according to the present invention, FIG. 3 shows a perspective view of a bottom plate of the liquid cleaning device according to the present invention.

DETAILED DESCRIPTION OF THE INVENTION

Figure 4:
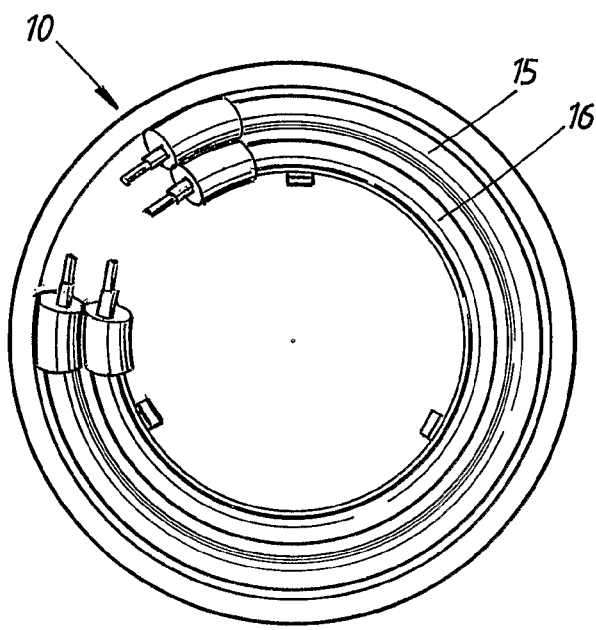
FIG. 4 shows a view from above of a heating member of the liquid cleaning device according to the present invention having two interconnected heating elements.
Figure 5:
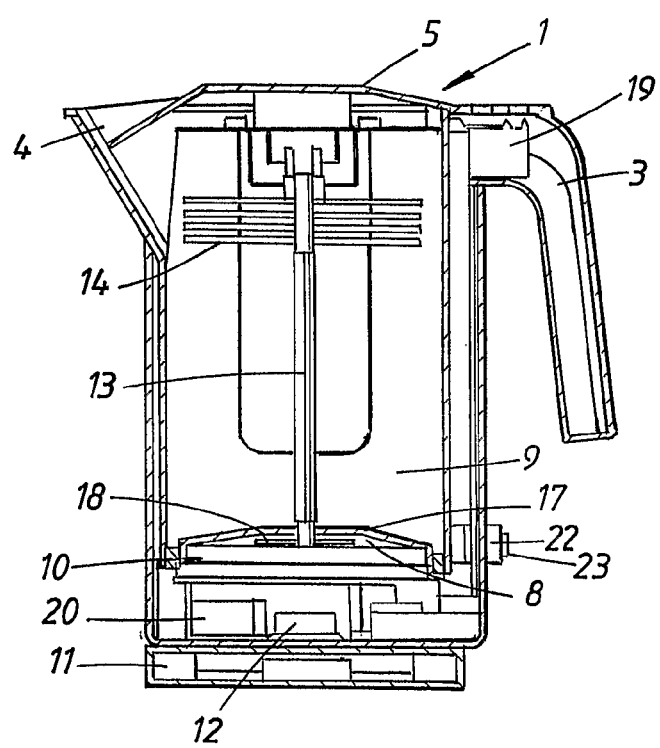
FIG. 5 shows a cross-section of the liquid cleaning device according to the present invention.

In FIGS. 1-5, an embodiment of the present invention is shown, applied to a liquid cleaning device intended for purifying liquid from pollutants. However, it should be directly emphasized that the invention is in no way limited to this type of liquid cleaning device, but may be applied to various liquid cleaning devices.

FIG. 1 shows a perspective view of the liquid cleaning device 1 according to the present invention. The liquid cleaning device 1 comprises a vessel 2, which in the figures looks like an ordinary cylindrical pot having handle 3, spout 4 and lid 5. In order to be able to start and stop the cleaning process by hand, a start button 6 and a stop button 7 are arranged on the handle 3. The vessel 2 consists of a lower chamber 8 and an upper chamber 9, which are divided from each other by means of a cap 17 of some insulating material, see FIG. 5. In the lower chamber 8, the liquid is heated by a heating member 10, which is supplied with electrical energy from a bottom plate 11 via an upward projecting electrical contact member 12, see FIG. 3.

Furthermore, the liquid cleaning device 1 comprises a riser 13, which is connected to the lower chamber 8 and extends upward to the upper part of the upper chamber 9. When the liquid is heated in the lower chamber 8, gas bubbles are formed, which force the heated liquid up through the riser 13 up to the upper part of the upper chamber 9. Via the upper end 21 of the riser 13, the liquid is then distributed on a liquid-distributor member 14 arranged in the upper chamber 9, which liquid-distributor member is arranged to impart the liquid an increased area of exposure to surrounding air, impurities in question being released in the form of gas from the liquid and disappearing through the spout 4 of the pot and via slits between the pot and the lid 5 of the pot, see FIG. 2. In the illustrated case, the liquid-distributor member 14 is formed as at least one plate having a plurality of holes, but it is fully feasible to have a liquid-distributor member consisting of, e.g., steel wool or plastic balls in order to obtain a large area of exposure to surrounding air. It is furthermore conceivable to only use the inner surfaces of the vessel 2 as areas of exposure to surrounding air. Then the liquid runs by means of the gravity back downward outside the riser 13 and is collected in the lower part of the upper chamber 9 of the vessel.

Because the upper chamber 9 and the lower chamber 8 are in at least conditioned communication with each other by, for instance, a valve 18, liquid can be transferred from the upper chamber 9 to the lower chamber 8, as liquid is pressed up in the riser 13. The valve 18 allows liquid to run from the lower part of the upper chamber 9 to the lower chamber 8 and simultaneously blocks steam from coming out of the lower chamber 8 other than through the riser 13. This is possible by the fact that the steam bubbles press down the valve 18 when they are formed and let the valve 18 up when they go up through the riser 13, so that the liquid can run into the lower chamber 8. This technique is previously known, per se, see for instance the Swedish patent specification 510287, page 4, para 6.

FIG. 4 shows an embodiment of the heating member 10 having two interconnected heating elements 15, 16, which heating member 10 can assume at least two power levels. However, it should be emphasized that the number of heating elements of the heating member 10 is not limited in number. It is, e.g., also possible to interconnect more than two heating elements 15, 16 for the invention to work. In order to obtain a liquid cleaning device 1 with a continuous transportation of liquid, without interruption by, for instance, flashing, a change-over member 19 is arranged to automatically reduce the power level of the heating member 10. The change-over member 19 is formed so that the automatic reduction of the power level of the heating member advantageously is triggered by, for instance, the boiling of the liquid or by a timer 20. Said change-over member 19, which in the embodiment example conveniently is placed in the handle 3 of the pot, comprises advantageously a bimetal, but may also comprise another appropriate device that gives a safe change-over of the power levels.

Depending on how long cleaning process being desired, a timer 22 may be arranged to adjust the length of the processing time after the boiling of the liquid has started. The processing time is suitably set by means of a knob 23 arranged on the timer. When the set processing time is over, the heating member connected to the timer is shut off and the cleaning process is now completed. In the illustrated case, the timer 22 is formed with a mechanical knob 23, but it is fully feasible to have a digitally settable timer for the setting of the processing time.

The invention claimed is:

1. A liquid cleaning device for purifying liquid from pollutants, comprising:
   a vessel, having a lower chamber and an upper chamber, said lower chamber being connected to a heating member arranged to heat the liquid in said lower chamber;
   a riser and liquid-distributor member, said riser being arranged to transport heated liquid from said lower chamber up to the upper part of said upper chamber, wherein the liquid-distributor member is arranged to impart the heated liquid an increased area of exposure to surrounding air, the liquid then, by means of the gravity, running back downward outside the riser and being collected in the lower part of the upper chamber of the vessel;
   said upper chamber and lower chamber being in communication with each other to allow transfer of the liquid from the upper chamber to the lower chamber;
   wherein the heating member is arranged to assume at least two power levels; and
   a change-over member being arranged to automatically reduce the power level of the heating member;
   wherein the change-over member is formed so that the automatic reduction of the power level of the heating member is triggered by the boiling of the liquid.

2. A liquid cleaning device for purifying liquid from pollutants, comprising:
   a vessel, having a lower chamber and an upper chamber, said lower chamber being connected to a heating member arranged to heat the liquid in said lower chamber;
   a riser and liquid-distributor member, said riser being arranged to transport heated liquid from said lower chamber up to the upper part of said upper chamber, wherein the liquid-distributor member is arranged to impart the heated liquid an increased area of exposure to surrounding air, the liquid then, by means of the gravity, running back downward outside the riser and being collected in the lower part of the upper chamber of the vessel;
   said upper chamber and lower chamber being in communication with each other to allow transfer of the liquid from the upper chamber to the lower chamber;
   wherein the heating member is arranged to assume at least two power levels; and
   a change-over member being arranged to automatically reduce the power level of the heating member;
   wherein the liquid cleaning device comprises a timer and that the change-over member is formed so that the automatic reduction of the power level of the heating member is triggered by said timer.

3. Liquid cleaning device according to claim 1, wherein the liquid cleaning device comprises a timer that is formed so that it adjusts the length of the processing time after boiling of the liquid has started.

4. Liquid cleaning device according to claim 1, wherein the change-over member comprises a bimetal that provides the reduction of the power level of the heating member.

5. Liquid cleaning device according to claim 1, wherein the heating member comprises at least two heating elements.

6. Liquid cleaning device according to claim 5, wherein the higher power level means that all heating elements are active.

7. Liquid cleaning device according to claim 1, wherein the liquid-distributor member comprises at least one plate having a plurality of holes that are distributed over the surface of the plate, and that the liquid-distributor member is arranged in the upper part of the upper chamber of the vessel.

* * * * *